United States Patent
Braunstein et al.

(10) Patent No.: US 8,380,051 B1
(45) Date of Patent: Feb. 19, 2013

(54) VARIOUS METHODS AND APPARATUSES FOR AN EMBEDDED VIDEO PLAYER

(75) Inventors: Ariel Braunstein, San Francisco, CA (US); John Louis Warpakowski Furlan, Belmont, CA (US); Jonathan Kaplan, San Francisco, CA (US)

(73) Assignee: CISCO TECHNOLOGY, Inc., San Jose, CA (US)

( * ) Notice: Subject to any disclaimer, the term of this patent is extended or adjusted under 35 U.S.C. 154(b) by 1434 days.

(21) Appl. No.: 12/016,696

(22) Filed: Jan. 18, 2008

Related U.S. Application Data

(60) Provisional application No. 60/888,917, filed on Feb. 8, 2007.

(51) Int. Cl.
*H04N 5/92* (2006.01)
(52) U.S. Cl. .......................................... 386/326; 84/601
(58) Field of Classification Search ................... 386/326; 84/601
See application file for complete search history.

(56) References Cited

U.S. PATENT DOCUMENTS

| | | | |
|---|---|---|---|
| 5,915,261 A * | 6/1999 | Chan | 711/115 |
| 6,231,148 B1 | 5/2001 | Silverbrook | |
| 6,356,357 B1 | 3/2002 | Anderson et al. | |
| 6,433,818 B1 * | 8/2002 | Steinberg et al. | 348/161 |
| 6,567,119 B1 | 5/2003 | Parulski et al. | |
| 6,758,716 B1 * | 7/2004 | Rehkemper et al. | 446/297 |
| 6,950,129 B1 | 9/2005 | Minne et al. | |
| 6,973,453 B2 | 12/2005 | Culp et al. | |
| 7,126,629 B1 | 10/2006 | Braunstein et al. | |
| 2001/0030773 A1* | 10/2001 | Matsuura et al. | 358/471 |
| 2005/0099499 A1* | 5/2005 | Braunstein et al. | 348/207.99 |

OTHER PUBLICATIONS

U.S. Appl. No. 11/497,039, filed Jul. 31, 2006, Kaplan et al.

* cited by examiner

*Primary Examiner* — Philip Chea
*Assistant Examiner* — Ghazal Shehni
(74) *Attorney, Agent, or Firm* — Patterson & Sheridan, LLP

(57) ABSTRACT

In general, a digital video player is described that has a form factor that allows the video player to be built into or otherwise attached to another enclosure. The digital video player may be built into or otherwise attached to the other enclosure such as any physical packaging around or accompanying a product, a Point of Sale (POS) structure near the product in a store, or attached to the product itself.

20 Claims, 5 Drawing Sheets

The form factor of the video player is embedded in or otherwise attached to an external surface of the main product itself or a surface of the packaging accompanying the main product, and a wire of a DC power source of the video player connects to a power source of the main product.
430

Providing guidance that the video player is to be recycled along with the packaging material of the product. The digital video player is then recycled along with the packaging material that it is embedded in or attached to.
435

The form factor of the digital video player may also be configured for merely one cycle of usage for the device because the form factor is embedded in or otherwise attached to the packaging of the product in a manner in which the digital video player is to be thrown away with the rest of the packaging materials after the digital video player fulfils its purpose
440

End

Figure 4b

VARIOUS METHODS AND APPARATUSES FOR AN EMBEDDED VIDEO PLAYER

RELATED APPLICATIONS

This application claims the benefit of and incorporates in by reference United States provisional patent application titled "Various methods and apparatuses for a One Time Use Embedded Video Player," Ser. No. 60/888,917, filed Feb. 8, 2007.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD

Aspects of embodiments of the invention generally relate to a digital video player that accompanies a product or a family of products to provide audible and visual information about those products to a person.

BACKGROUND

Products are increasingly becoming more complex and the variety product choices even within a particular product family continues to grow. Sales clerks at stores are becoming less and less informed on the capabilities of these various products.

SUMMARY

In general, a digital video player is described that has a form factor that allows the video player to be built into or otherwise attached to another enclosure. The digital video player may be built into or otherwise attached to the other enclosure such as any physical packaging around or accompanying a product, a Point of Sale (POS) structure near the product in a store, or attached to the product itself.

BRIEF DESCRIPTION OF THE DRAWINGS

FIGS. 4*a* and 4*b* illustrate a flow diagram for an embodiment of the video camera.

Figure 1:
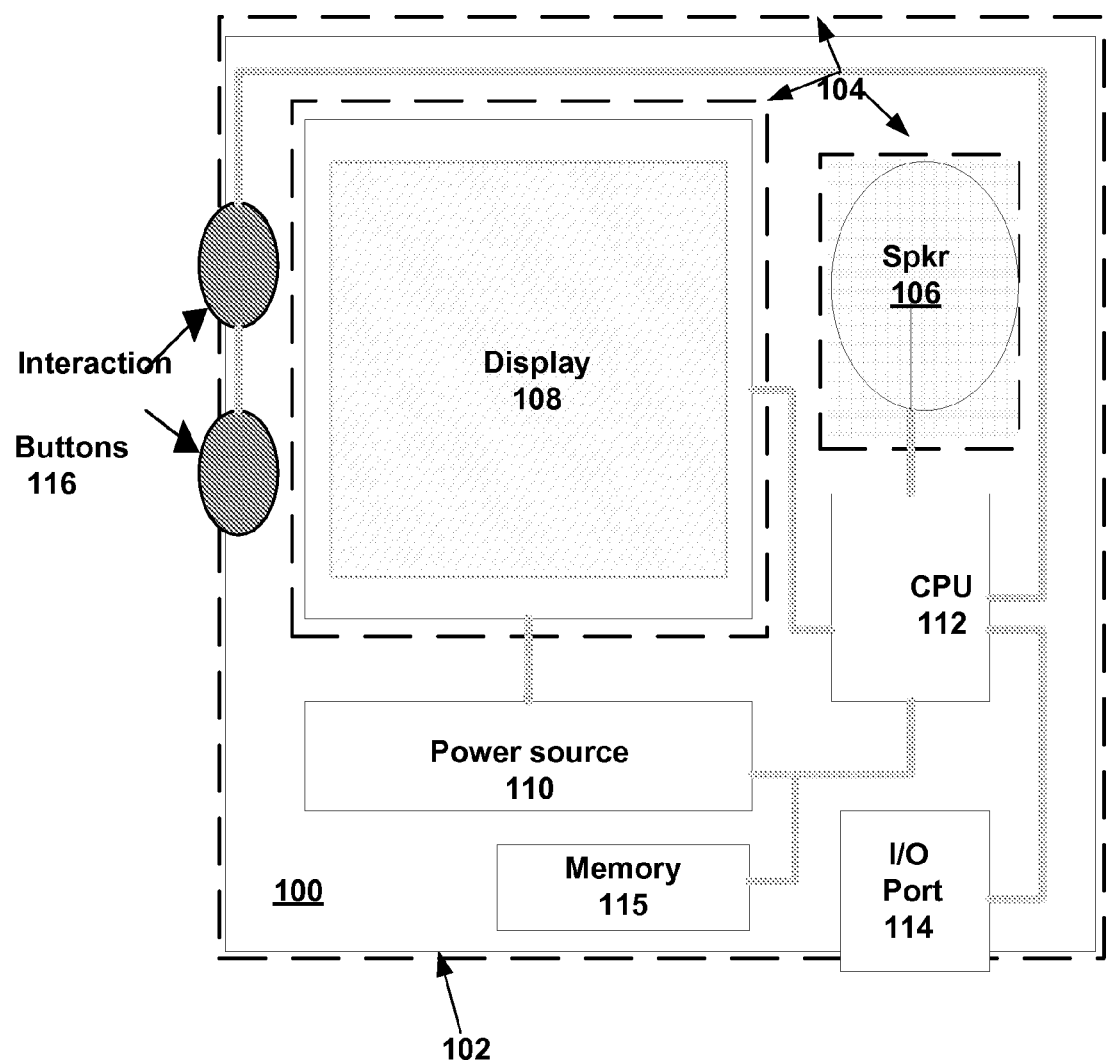
FIG. 1 illustrates a block diagram of an embodiment of the digital video player that has form factor that allows the video player to be built into other enclosures.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific signals, named components, connections, types of embedded video players, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details may be varied from and still be contemplated to be within the spirit and scope of the present design. The following drawings and text describe various implementation of the design.

In general, a digital video player is described that has a form factor, i.e. size, shape, and geometric arrangement of the fabricated digital video player, that allows the video player to be built into other enclosures.

FIG. 1 illustrates a block diagram of an embodiment of the digital video player that has form factor that allows the video player to be built into other enclosures.

Referring to FIG. 1, the digital video player may include a small color display 108, one or more physical interaction button(s) 116, a small speaker 106, a power supply 110 optionally built-in or external, a processing unit 112, an Input-Output (I/O) port and module 114, a memory 115, and other similar components. A first form factor 102 of the device allows the digital video player to be built into other enclosures 104 (such as packages, pallets, fixtures, signs, etc.) while allowing its color display 108 and buttons 116 to be exposed for consumer interaction. For example, a main product, such as an electronic consumer device (wireless router, camera, satellite box, etc.) comes in some shipping/storage packaging surrounding the electronic consumer device. The form factor 102 of the digital video player then embeds into or otherwise attaches to another enclosure 104 such as the main product, the packaging surrounding or accompanying the main product, or as a discrete unit but somewhere near a point of sale structure the main product in a store.

The form factor 102 contains various parts of the digital video player. The I/O port and module 114 loads and updates any of audio content, video file content and Graphic User Interface (GUI) interaction content to be conveyed to a person by the digital video player. The non-volatile memory 115 stores the uploaded audio content, video file content and GUI interaction content as well as video player application software to operate the digital video player. A small color display 108 that has dimensions of less than the enclosure around the main product, such as smaller than 3 inches by 3 inches, to allow the person to see the audio/video/GUI interaction content. One or more physical interaction buttons 116 and a small speaker 106 are also parts of the digital video player. A processing unit 112 with logic processes functionality with the I/O module and port 114, user interaction with the GUI and the one or more buttons 116, and the retrieval of and playback of the audio content and the video content through the speaker 106 and the color display 108, and other similar processing. The processing unit 112 may merely contain logic blocks to decode and play the uploaded audio and video files rather than any logic blocks to encode and record video information captured by the digital video player. The Direct Current power supply 110 powers the non-volatile memory 115, the processing unit 112, the color display 108, and the speaker 106. The form factor 102 embeds the video player components into the other enclosures such that merely the color display 108 and the one or more physical interaction buttons 116 are exposed for interaction by the person and the enclosure 104 has an opening for the person to hear the speaker 106. The form factor 102 includes a casing that is built into or otherwise attached to the other enclosures 104 that are selected from the group consisting of any physical packaging around or accompanying a main product, point of sale (POS) structure near the main product in a store, or attached to the main product itself.

The digital video player may be a One-Time-Use cycle embedded digital video Player (OTUP) that is a low-cost merchandising and/or instructional tool that allows companies to embed a short video clip/file (with possible interaction points) in any physical package, point of sale (POS), or an actual product enclosure.

Figure 2:
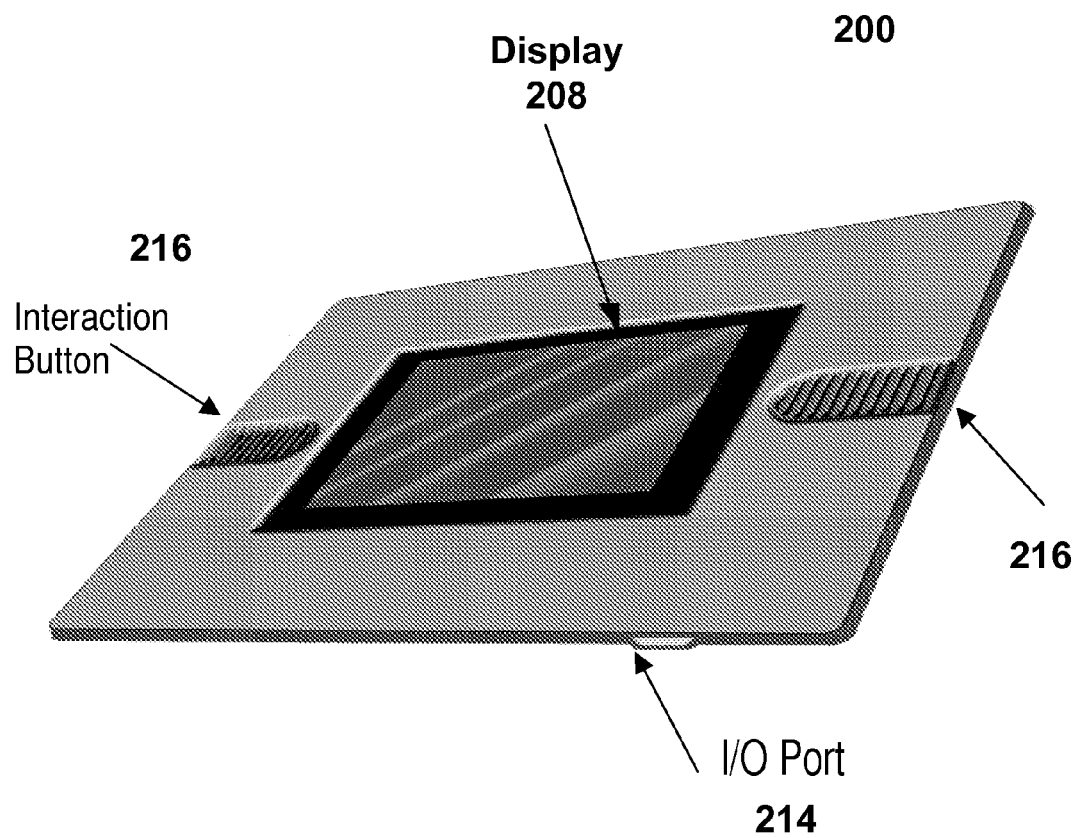
FIG. 2 illustrates a perspective view of an embodiment of the digital video player.
Figure 3:
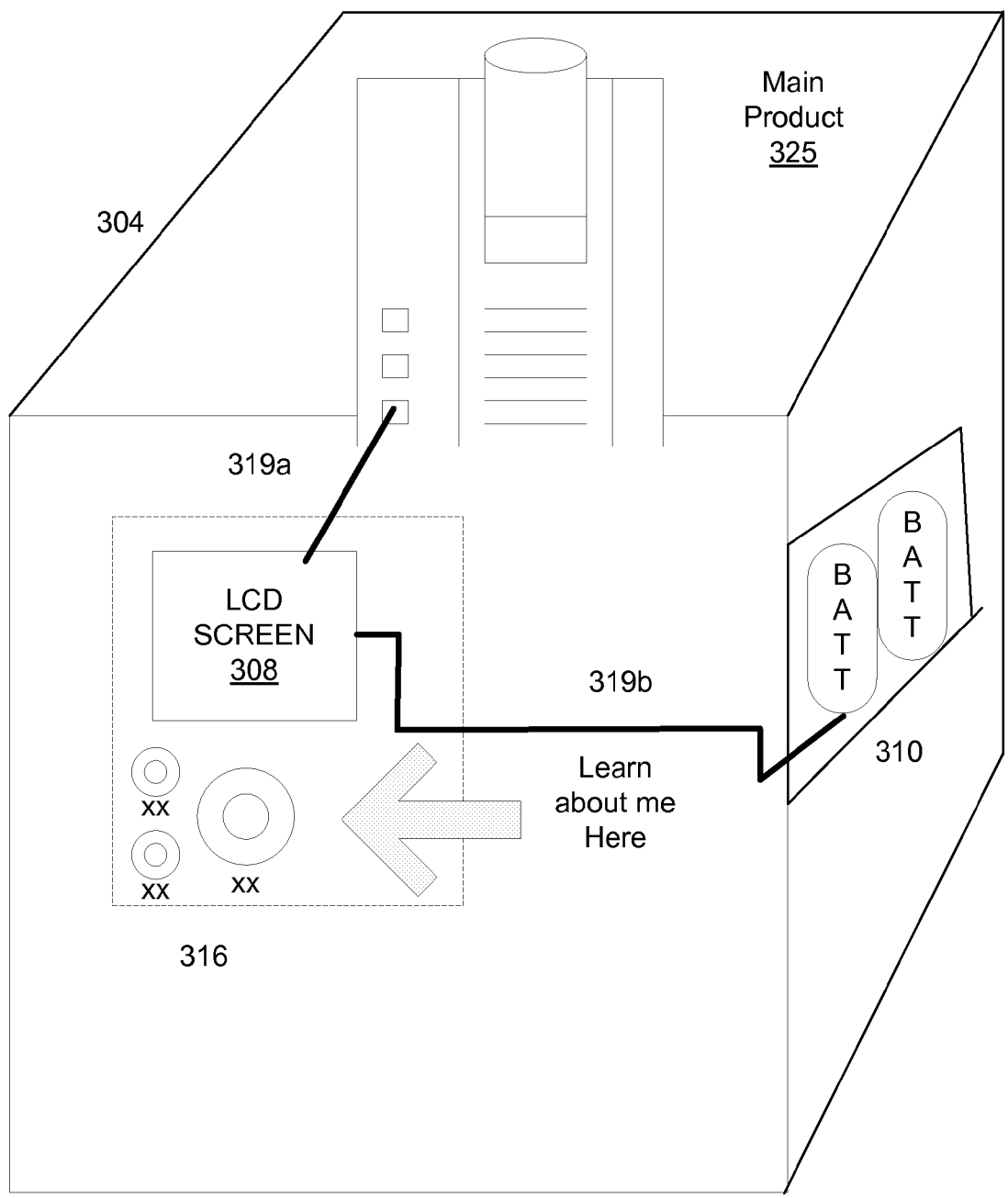
FIG. 3 illustrates a diagram of the digital video player attached to a surface of the packaging for the main product with an access hole to the digital video player with wiring to an external power source of either batteries embedded in/attached to the packaging or plugs into the main product itself.

FIG. 2 illustrates a perspective view of an embodiment of the digital video player. Referring to FIGS. 2 and 3, the casing 202 of the digital video player may be attached to an external surface of the packaging 304 for the main product 325, attached to an internal surface of the packaging 304 for the main product 325 with one or more access holes to the I/O ports 214, to the one or more physical interaction buttons 216, and to the speaker of the digital video player and area to view a display screen 208 of the digital video player, or located otherwise as previously described above.

Referring to FIG. 2, the digital video player is capable of playing full motion video on the display 208 with a bright enough picture and a loud enough sound through the speakers for the environment where the digital video player would be used (a noisy store for example). The digital video player provides a video file, potentially augmented with still pictures, illustrations, and textual slides, to interactively communicate marketing information, retail training information, basic customer support information, merchandising information, tech support information or similar information to a user, such as a consumer when a user presses at least one interaction button 216 of the digital video player.

The video player may have a low power, small color display 208 (such as Liquid Crystal Display, Color Super Twisted Nematic matrix, etc.). The smaller that the small color display 208 is in physical dimension, then the smaller number of pixels, and the smaller amount of memory is needed and overall less power is consumed. Some embodiments of the video player with smaller display dimensions may have corresponding shipped paper guides to illustrate figures and step-by-step procedures that the video file playing on the display visually and aurally conveys. The content in the video file may also specifically refer to specific figures or pages in the corresponding shipped guides. The smaller the physical dimensions of the display 208 the more likely a corresponding paper documentation will exist. On other embodiments, digital still images and slides may be displayed on the display screen 208 with plenty of pause time to let the user view and take in the information being communicated by the tiny display screen 208. The display 208 may have the refresh rate high enough to convey video information but in some cases, such as where extensive use of slides and still pictures are used, the refresh rate may be very low.

On some embodiments, the color display screen 208 is made with reflective material, either completely (100%) or partially (<100%) transflective, and as such the display screen 208 makes use of ambient lighting conditions as part of a source to light images appearing on the color display screen 208. A 100% transflective LCD display uses both transmissive and reflective methods. A reflective LCD merely uses the ambient light in the vicinity. The light passes through the LCD layer to a mirror, which reflects it back to the viewer. The transflective LCD uses both backlight as does transmissive, but also adds a reflective mirror that lets light pass through from the back. Thus, the LCDs can be built with front lights, which significantly improve the viewing in dimly lit environments.

The speaker can be configured for low power consumption (similar to what used in small digital cameras and camcorders). The dynamic audio range of the speaker may be specifically chosen to match an audio range of the content of the video file in order to increase a quality of the audio sound from the speaker while decreasing size and cost of the speaker.

The processing unit may be a Central Processing Unit or Application Specific Integrated Circuit that includes the ability to handle I/O, user interaction and audio/video playback with peripheral devices (similar chips to what is used in low-cost digital cameras). The processing unit may merely contain the logic blocks to decode and play a video file rather than logic blocks to encode and record video information. Any updates to the video content will be encoded on a server and then merely uploaded into the digital video player. The chip containing the processing unit may be a single chip composed of active components such as a capacitor and passive components such as resistors.

The I/O port 214 is a connection that loads and updates the audio/video/and GUI interaction content. The I/O port 214 can be a physical I/O port that sends and receives data at rates established by a communication standard such as (USB, SPI, etc.) and the video player has a corresponding physical I/O circuit module contained within the casing of the form factor 202. Use of a serial I/O port as the I/O port 214 may be the lowest power consumption and cheapest mechanism to implement. The connector may accept standard connection formats such as USB, serial, and parallel port connectors. Alternatively, the I/O port connector may be of a proprietary design.

The I/O port 214 can be a wireless I/O port (infrared, Bluetooth, Wi-Fi such as 802.11, etc., and the video player has a corresponding Wi-Fi module that transmits and receives frequencies and data rates established by a Wi-Fi standard via an antenna connected to the Wi-Fi module. The antenna to transmit and receive the packets wirelessly as radio frequency waves at transmitted frequencies and data rates established by the Wi-Fi standard to and from another Wi-Fi enabled device.

The Wi-Fi module may communicate with other enabled devices that comply with the Institute of Electrical and Electronics Engineers (IEEE) 802.11 wireless Ethernet standards or other similar wireless standards such as 802.15, used for Wireless Personal Area Networks (WPANs) including Bluetooth technology, and WiMax, also known as 802.16 that combines broadband and wireless.

In an embodiment, the Wi-Fi module may use a Wi-Fi standard, such as the 802.11b or 802.11g standards that transmit at 2.4 GHz as well as the 802.11a standard that transmits at 5 GHz. These frequencies are considerably higher than the frequencies used for cell phones, walkie-talkies and televisions. The higher frequency allows the signal to carry more data.

The content in the video file stored in the memory of the digital video player may be uploaded into the memory at the factory and dynamically augmented or changed via uploading at a store. Whether the I/O port 214 is a physical port or a wireless port can be based on data/throughput, power consumption and cost requirements of the specific application. In low cost and low power applications, a serial I/O port may be desired.

The digital video player power management software and other low power components manage power very efficiently in order to maximize storage life (before first use) and shelf-life (while the digital video player is used by consumers). The video decompression algorithm executed as software instructions or as hardware logic by the processing unit may be a low power consuming algorithm such as highly efficient algorithm in decoding and posses merely decoding capability, i.e. MPEG 4, H264, H263, and other similar decompression algorithms. The corresponding server may employ complex encoding and compression to make the decoding algorithm.

The interaction buttons 216 may be used for power-up and user interaction. The interaction buttons 216 operate potentially like a softkey button set in which the meaning associated with the depression of the physical button changes depending upon the current status of the user interface screen presented to the consumer at the time the physical button is pressed. However, using physical button pressing to make contact usually results in less power consumption in the device verses active softkey maintenance.

The embedded video player may have a limited Graphic User Interface (GUI) program resident in the video player that triggers various stored video clips in response to the user making selections on the interaction buttons 216 associated with the GUI.

Referring to FIG. 3, the video player can also have one or more physical interaction buttons 316 that have printed text by them and no GUI software resident, but the pressing of the buttons 316 triggers the display 308 to play various stored video clips in the non-volatile memory in response to the user making selections on the buttons 316.

FIG. 3 illustrates a diagram of the digital video player attached to a surface of the packaging for the main product with an access hole to the digital video player with wiring to an external power source of either batteries embedded in/attached to the packaging or plugs into the main product itself.

The form factor of the video player can also be embedded in or otherwise attached to an external surface of the main product itself 325 and a wire 319a of the DC power source connects to a power source of the main product 325. The form factor of the digital video player may also be standalone display near the shelves containing the main product 325 associated with the digital video player. The digital video player can be associated with some main product to help explain things about that main product such as initial setup of the main product, merchandising material about the product or product line family, marketing material about the main product to educate about the product, etc.

The DC Power supply 310 may consists of disposable or rechargeable batteries such as AAA or special battery packs. The DC Power supply 310 may be an internal low profile small dimension battery, such as a watch or cell phone battery, an external battery embedded in the packaging connected via a wire 319b, an external battery in the associated main product itself connected via a connector cable 319a, a solar powered or at least solar augmented battery, a fuel cell, or similar DC power device. The DC power source 310 also may have a power drain prevention device/circuit, such as a pull tab, clock, etc., cutting off most if not all of the components in the video player from drawing power from the DC power source 310 to minimize battery power consumption prior to the desired use of video player in a store. Active Power management software may be running resident to turn power off the unit after a preset amount of time of non-use. The software may keep the display 308 active and lit for a preset time after the video file is initially played in anticipation that the video file may be replayed by the consumer to verify conveyed information.

The digital video player can be used in a wide variety of applications including the following examples.

The digital video player can be used on package product promos—for consumer interaction in the store ("Try-Me" or "Learn More" type of a package). The digital video player can be used on a Point Of Service consumer guidance structure (i.e. integrated into a fixture), helping consumers to make the best choice out of a variety of purchase options. The digital video player can be used for setup directions. The form factor of the digital video player is built into packaging or product enclosure of products where assembly is complex (thereby increasing satisfaction and reducing returns). The digital video player provides a way for the main product maker to have more than one communication mechanism to communicate a basic initial setup of their product and perhaps a quick common questions and answers session, which will increase consumer satisfaction and decrease customer and tech support calls. The content of the video may communicate what the product does, typical uses, and potentially what other products in a similar family line do so that the consumer may choose the right product to purchase the first time.

The digital video player allows an interactive one on one session with a potential consumer or staff member at a store. The potential consumer presses one or more buttons 316 to start the digital video player, which then conveys information to guide the consumer to make choices. The content displayed may be variable as the consumer may depress a button 316 to select a branch down the information pathway presented by the GUI several times throughout the presentation to ultimately find the end information the user is seeking. Some user interaction is required causing the one on one session to start rather than the digital video player projecting/broadcasting out information the same video file continuously. The associated video file typically has one or more interaction points in content of the video file with the user to make choices/complete steps in setting up the associated main product.

The form factor of the digital video player may be configured for one cycle of usage device because the form factor is embedded in or otherwise attached to the packaging of the product in a manner in which the digital video player is typically thrown away with the rest of the packaging materials after the digital video player fulfils its purpose.

The digital video player also may be recycled along with the packaging material that it is embedded in. A more expensive digital video player model may be taken out of the packaging box (or the shelf) and returned to be recycled for next use (like a one time use digital camera). The recycling program can be done through returning the digital video player to an in-store server (like those in existence for one time use digital cameras), reconditioning the digital video player remotely through the internet, or by physically sending the digital video player to a refurbishment facility where the digital video player is reconditioned and loaded with new content.

Thus, this digital video player can be made for truly a single-use solution (on a package for example) or for ongoing use where batteries can be replaced or power can be drawn out of an external source such as an external wire along the internal packaging to a battery pack also embedded in the packaging or and external wire to connect with a battery of the main product itself. The digital video player can be made with a single "Try-Me" type of a button or with several physical buttons 316 where the user would be asked to choose from several onscreen options (instructions for example). There could be models of different screen size, quality and cost based on the specific application and its needs.

In one embodiment, the software used to facilitate the embedded video player can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

Figure 4A:
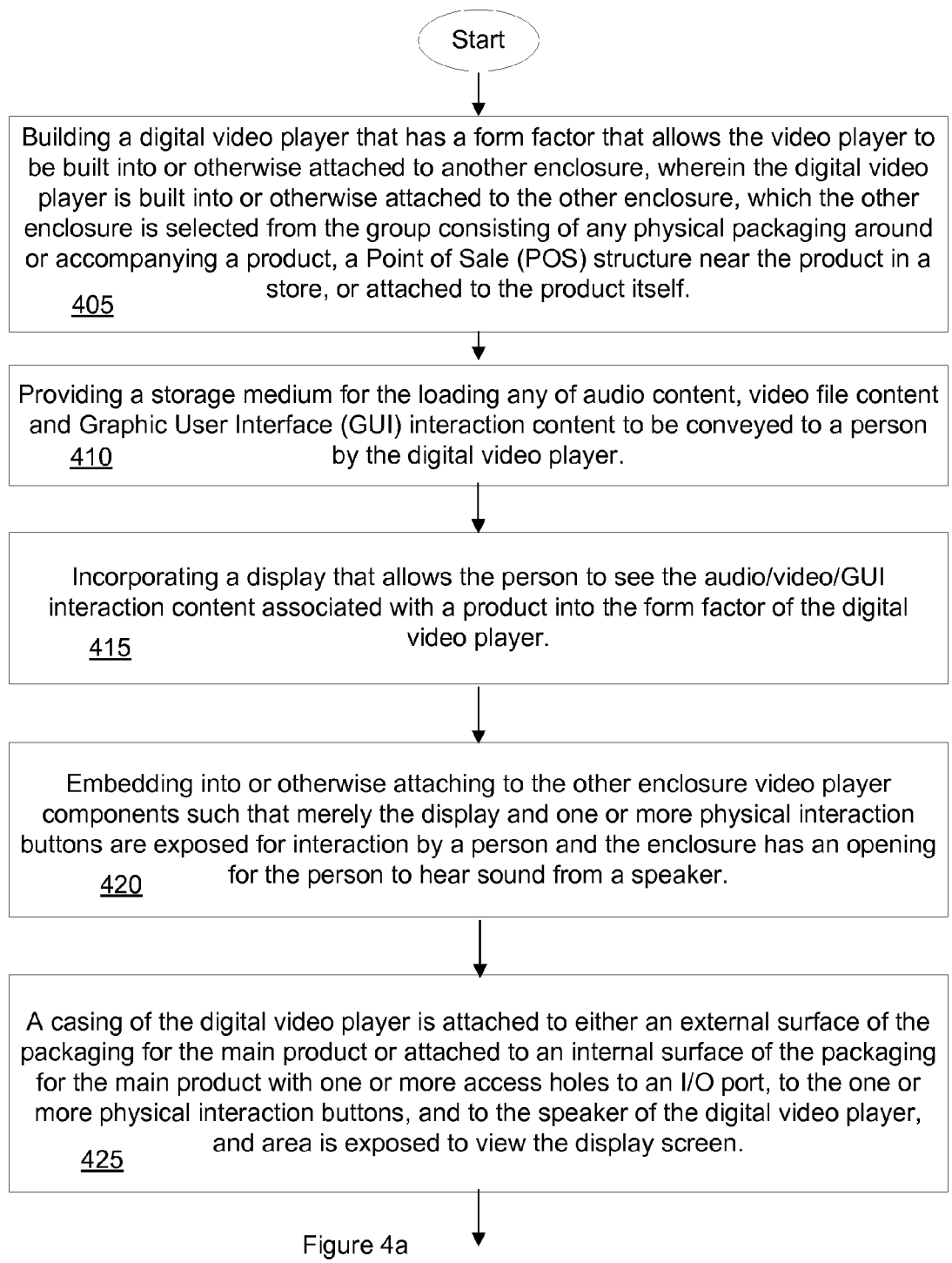

FIGS. 4a and 4b illustrate a flow diagram for an embodiment of the video camera.

In block 405, a digital video player is built that has a form factor that allows the video player to be built into another enclosure. The other enclosure is selected from the group consisting of any physical packaging around or accompanying a product, a Point of Sale (POS) structure near the product in a store, or a casing of the product itself.

In block 410, a store medium is provided in the digital video player for the loading of any of audio content, video file content and Graphic User Interface (GUI) interaction content to be conveyed to a person by the digital video player.

In block 415, a display that allows the person to see the audio/video/GUI interaction content associated with a product is incorporated into the form factor of the digital video player.

In block 420, the digital video player components are embedded into or otherwise attached to the other enclosure such that merely the display and one or more physical interaction buttons are exposed for interaction by a person and the enclosure has an opening for the person to hear sound from a speaker.

In block 425, the casing of the digital video player may be attached to either an external surface of the packaging for the main product or attached to an internal surface of the packaging for the main product with one or more access holes to an I/O port, to the one or more physical interaction buttons, and to the speaker of the digital video player, and area is exposed to view the display screen.

In block 430, the form factor of the video player may be embedded in or otherwise attached to an external surface of the main product itself or a surface of the packaging accompanying the main product, and a wire of a DC power source of the video player connects to a power source of the main product.

In block 435, the manufacturer may provide guidance, including written directions, that the video player is to be recycled along with the packaging material of the product and how the video player is to be recycled. The digital video player is then recycled along with the packaging material that it is embedded in or attached to.

In block 440, the form factor of the digital video player may also be configured for merely one cycle of usage for the device because the form factor is embedded in or otherwise attached to the packaging of the product in a manner in which the digital video player is to be thrown away with the rest of the packaging materials after the digital video player fulfils its purpose.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The embodiments described above are merely illustrative of the principles of the invention. It will be apparent to one who is skilled in the art that many other variations and modifications can be made to the above-described embodiments without departing from the spirit and scope of the invention. The scope of the invention is therefore to be interpreted in accord with the limits set forth by the appended claims.

We claim:

1. A digital video player, comprising:
a form factor that allows the digital video player to be built into a separate enclosure, where the form factor comprises:
an Input-Output (I/O) port and an I/O module configured for loading and updating at least one of audio content, video file content, and Graphic User Interface (GUI) interaction content to be conveyed to a user of the digital video player;
a non-volatile memory configured to store video player application software to operate the digital video player and at least one of the audio content, video file content and GUI interaction content;
a color display that allows the user to see at least one of the audio content, video file content, and GUI interaction content that relates to a product that is different from the digital video player;
one or more physical interaction buttons;
a speaker;
a processing unit comprising configured logic to control the I/O module and port, user interaction with the GUI interaction content and the one or more physical interaction buttons, and the retrieval of and playback of the audio content and the video content through the speaker and the color display, where the processing unit contains logic blocks configured to decode and play the uploaded audio and video content files and does not contain any logic blocks to encode and record captured video information;
a Direct Current power supply to power the non-volatile memory, the processing unit, the color display, and the speaker; and
a casing that contains the form factor, wherein the casing is built into the separate enclosure such that the color display, the one or more physical interaction buttons, and the speaker are associated with at least one opening in the separate enclosure, wherein the separate enclosure comprises at least one of: a physical packaging around the product, a physical packaging accompanying the product, a Point of Sale (POS) structure associated with the product, and a casing of the product.

2. The digital video player of claim 1, wherein the I/O port is configured to load and update the video file and is a physical I/O port that sends and receives data at rates established by a communication standard and the digital video player has a corresponding physical I/O module contained within the form factor.

3. The digital video player of claim 1, wherein the I/O port is configured to load and update the video file and is a wireless I/O port and the digital video player has a corresponding Wi-Fi module that transmits and receives signals at frequencies and data rates established by a Wi-Fi standard via an antenna connected to the Wi-Fi module.

4. The digital video player of claim 1, wherein the color display screen is made with reflective material that is one of completely transflective or partially transflective, and the color display screen makes use of ambient lighting conditions as part of a source that generates images appearing on the color display screen.

5. The digital video player of claim 1, further comprising a video decompression algorithm that is executed as software instructions or as hardware logic by the processing unit and is capable only of decoding.

6. The digital video player of claim 1, wherein a dynamic audio range of the speaker is specifically chosen to match an audio range of the content of the video file content in order to increase a quality of the audio sound from the speaker.

7. The digital video player of claim 1, wherein the DC power source has a power drain prevention component that cuts off a majority of the components in the digital video player from drawing power from the DC power source to minimize battery power consumption prior to the desired use of the digital video player.

8. The digital video player of claim 1, wherein the digital video player is configured to be recycled along with the packaging material of the product.

9. The digital video player of claim 8, wherein the POS structure is near the product in a store associated with at least one of the audio content, video file content, and GUI interaction content being shown on the color display screen.

10. The digital video player of claim 1, wherein the casing of the digital video player is one of: attached to an external surface of the packaging for the product or attached to an internal surface of the packaging for the product, wherein the packaging for the product comprises one or more access holes to the I/O port, one or more access holes to the one or more physical interaction buttons, and one or more access holes to the speaker of the digital video player, and the at least one opening exposes the color display screen to the view of the user, wherein the color display screen has dimensions less than dimensions of the packaging for the product.

11. The digital video player of claim 1, wherein the form factor of the digital video player is embedded in an external surface of the product itself and a wire connected to the DC power source connects to a power source of the product.

12. The digital video player of claim 11, wherein the form factor of the digital video player a one cycle usage device.

13. The digital video player of claim 1, wherein the digital video player GUI program resident in the digital video player triggers a stored video clip to be displayed on the color display screen in response to the user making selections with one of the physical interaction buttons.

14. The digital video player of claim 1, wherein the physical interaction buttons are associated with printed text on at least one of the chassis of the digital video player and the separate enclosure, wherein the pressing of the physical interaction buttons trigger a stored video clip in the non-volatile memory to be displayed on the color display screen.

15. A method, comprising:
building a digital video player that has a form factor, the form factor defining a geometric arrangement of components in the digital video player;
providing a storage medium in the form factor for loading at least one of audio content, video file content and Graphic User Interface (GUI) interaction content to be conveyed to a user of the digital video player;
incorporating into the form factor a display that allows the user to see at least one of the audio content, video content, and GUI interaction content associated with a product that is different from the digital video player;
enclosing the form factor into a casing of the digital video player;
embedding into a separate enclosure the casing of the digital video player such that the display is viewable through an opening in the separate enclosure, the physical interaction buttons are accessible through the opening, and a speaker is audible through the opening;
wherein the separate enclosure comprises at least one of: a physical packaging around the product, a physical packaging accompanying the product, a Point of Sale (POS) structure associated with the product, and a casing of the product;
providing a processing unit comprising logic to control (i) user interaction with the GUI interaction content and the one or more physical interaction buttons and (ii) the retrieval of and playback of the audio content and the video content through the speaker and the display, wherein the processing unit contains logic blocks configured to decode and play the stored audio content and video content and does not contain any logic blocks to encode and capture video information; and
displaying on the display at least one of: a video including marketing information about the product, an instructional video for operating the product, and a troubleshooting video of the product.

16. The method of claim 15, wherein a casing of the digital video player is at least one of: attached to an external surface of the packaging for the product and attached to an internal surface of the packaging for the product, wherein the packaging for the product comprises one or more access holes to an I/O port, one or more access holes to the physical interaction buttons, and one or more access holes to the speaker of the digital video player, and the at least one opening exposes the display to the view of the user.

17. The method of claim 16, further comprising
providing guidance that the digital video player is to be recycled along with the packaging material of the product.

18. The method of claim 15, wherein the separate disclosure is the POS structure, wherein the form factor includes a casing of the digital video player that is built into the POS structure,
wherein the video including marketing information is a video promotion associated with the product.

19. The method of claim 15, wherein the form factor of the digital video player is embedded in an external surface of the product and a wire connected to a DC power source of the digital video player that connects to a power source of the product.

20. The method of claim 19, wherein the form factor of the digital video player is configured for only one cycle of usage.

* * * * *